(12) United States Patent
Misaizu et al.

(10) Patent No.: US 11,499,877 B2
(45) Date of Patent: *Nov. 15, 2022

(54) STRAIN GAUGE

(71) Applicant: MINEBEA MITSUMI Inc., Nagano (JP)

(72) Inventors: Eiji Misaizu, Kanagawa (JP); Shigeyuki Adachi, Shizuoka (JP); Kosuke Kitahara, Kanagawa (JP); Toshiaki Asakawa, Shizuoka (JP); Atsushi Kitamura, Shizuoka (JP)

(73) Assignee: MINEBEA MITSUMI Inc., Nagano (JP)

( * ) Notice: Subject to any disclaimer, the term of this patent is extended or adjusted under 35 U.S.C. 154(b) by 190 days.

This patent is subject to a terminal disclaimer.

(21) Appl. No.: 16/763,345

(22) PCT Filed: Nov. 1, 2018

(86) PCT No.: PCT/JP2018/040736
§ 371 (c)(1),
(2) Date: May 12, 2020

(87) PCT Pub. No.: WO2019/098048
PCT Pub. Date: May 23, 2019

(65) Prior Publication Data
US 2021/0063259 A1    Mar. 4, 2021

(30) Foreign Application Priority Data
Nov. 15, 2017    (JP) .............................. JP2017-220408

(51) Int. Cl.
G01L 1/22    (2006.01)
H01C 1/01   (2006.01)
H01C 7/00   (2006.01)

(52) U.S. Cl.
CPC .............. *G01L 1/2262* (2013.01); *H01C 1/01* (2013.01); *H01C 7/003* (2013.01)

(58) Field of Classification Search
CPC .......... H01C 1/01; H01C 7/003; G01L 1/2262
See application file for complete search history.

(56) References Cited

U.S. PATENT DOCUMENTS 4,311,980 A * 1/1982 Prudenziati ........... G01P 15/123
338/307
4,414,274 A * 11/1983 Hieber ................... H01C 7/006
428/428

(Continued)

FOREIGN PATENT DOCUMENTS

EP    0171467    2/1986
EP    725392    8/1996

(Continued)

OTHER PUBLICATIONS

International Search Report for PCT/JP2018/040736 dated Jan. 29, 2019.

(Continued)

Primary Examiner — Kyung S Lee
(74) Attorney, Agent, or Firm — IPUSA, PLLC

(57) ABSTRACT

A strain gauge includes a flexible substrate; and resistors each formed of a Cr composite film. The resistors include a first resistor and a second resistor that are formed on one side of the substrate, and include a third resistor and a fourth resistor that are formed on another side of the substrate. The first resistor, the second resistor, the third resistor, and the fourth resistor constitute a Wheatstone bridge circuit.

9 Claims, 5 Drawing Sheets

(56) References Cited

U.S. PATENT DOCUMENTS

| | | | |
|---|---|---|---|
| 4,758,816 A | | 7/1988 | Blessing et al. |
| 5,092,177 A | * | 3/1992 | Varacca ............... G01B 7/18 338/4 |
| 5,914,168 A | | 6/1999 | Wakamatsu et al. |
| 6,235,415 B1 | * | 5/2001 | Ogawa ................. C23C 28/04 428/698 |
| 6,729,187 B1 | * | 5/2004 | Gregory ................. H01C 7/06 73/765 |
| 10,622,125 B1 | * | 4/2020 | Ogawa ..................... H01C 1/14 |
| 10,921,110 B2 | * | 2/2021 | Misaizu .................. G01B 7/16 |
| 11,262,181 B2 | * | 3/2022 | Toda ....................... G01B 7/18 |
| 2005/0188769 A1 | | 9/2005 | Moelkner et al. |
| 2005/0276990 A1 | | 12/2005 | Kohara et al. |
| 2006/0189201 A1 | * | 8/2006 | Kieffer ................... H05K 1/16 439/465 |
| 2009/0001974 A1 | * | 1/2009 | Sheiretov ............... G01L 5/164 324/232 |
| 2009/0107251 A1 | * | 4/2009 | Inamori .................. G01B 7/20 73/849 |
| 2013/0082970 A1 | * | 4/2013 | Frey ..................... G06F 3/04144 345/173 |
| 2017/0038266 A1 | * | 2/2017 | Syck .................. H01B 13/0036 |
| 2018/0217016 A1 | | 8/2018 | Inamori et al. |

FOREIGN PATENT DOCUMENTS

| | | |
|---|---|---|
| JP | S53-027852 U | 3/1978 |
| JP | H05-014871 U | 2/1993 |
| JP | H06-300649 | 10/1994 |
| JP | H07-306002 | 11/1995 |
| JP | H08-102163 | 4/1996 |
| JP | H09-016941 | 1/1997 |
| JP | H10-335675 | 12/1998 |
| JP | 2007-173544 | 7/2007 |
| JP | 2015-031633 | 2/2015 |
| JP | 2016-074934 | 5/2016 |
| JP | 2016-136605 | 7/2016 |
| JP | 2017-067764 | 4/2017 |
| JP | 2017-101983 | 6/2017 |

OTHER PUBLICATIONS

Office Action dated Jun. 3, 2021 with respect to the corresponding Chinese Patent Application No. 201880085782.X.
Office Action dated Jan. 4, 2022 with regard to the corresponding Japanese patent application No. 2017-220408.
Office Action dated Jan. 13, 2022 with regard to the corresponding Chinese patent application No. 201880085782.X.
Office Action dated Sep. 6, 2022 with respect to the related Japanese patent application No. 2017-220407.
Office Action dated Sep. 6, 2022 with respect to the related Japanese patent application No. 2017-220408.
C. Rebholz et al., "Structure, mechanical and tribological properties of nitrogen-containing chromium coatings prepared by reactive magnetron sputtering", Surface and Coatings Technology, vol. 115, Issues 2-3, pp. 222-229, Jul. 18, 1999.
Haruhiro Kobayashi, Nikkan Kogyo Shimbun, Ltd., "Sputter thin film—Fundamentals and Applications", 1st Edition, 1st Printing, p. 102-107, Feb. 25, 1993 (With Partial Translation).
Kyoritsu Shuppan Co., Ltd., "Dictionary of Crystal Growth", 1st Edition, 1st Printing, p. 50-51, Jul. 25, 2001 (With Partial Translation).

* cited by examiner

STRAIN GAUGE

TECHNICAL FIELD

The present invention relates to a strain gauge.

BACKGROUND ART

A strain gauge is known to be attached to a measured object to detect strain on the measured object. The strain gauge includes a resistor for detecting strain, and as a resistor material, for example, material including Cr (chromium) or Ni (nickel) is used. The resistor is formed on a substrate made of, for example, an insulating resin (see, for example, Patent document 1).

CITATION LIST

Patent Document

[Patent document 1] Japanese Unexamined Patent Application Publication No. 2016-74934

SUMMARY

There are cases of forming four resistors in the same plane of a substrate to constitute a Wheatstone bridge circuit. However, when the four resistors are formed in one layer, there is a problem of a planar shape of a strain gauge increasing.

In view of the point described above, an object of the present invention is to reduce a planar shape of a strain gauge including four resistors that constitute a Wheatstone bridge circuit.

A strain gauge includes a flexible substrate; and resistors each formed of a Cr composite film, wherein the resistors include a first resistor and a second resistor that are formed on one side of the substrate; and a third resistor and a fourth resistor that are formed on another side of the substrate, and wherein the first resistor, the second resistor, the third resistor, and the fourth resistor constitute a Wheatstone bridge circuit.

Effects of the Invention

According to the disclosed technique, it is possible to reduce a planar shape of a strain gauge including four resistors that constitute a Wheatstone bridge circuit.

DESCRIPTION OF EMBODIMENTS

One or more embodiments will be hereinafter described with reference to the drawings. In each figure, the same numerals denote the same components; accordingly, duplicative explanations may be omitted.

First Embodiment

Figure 1:
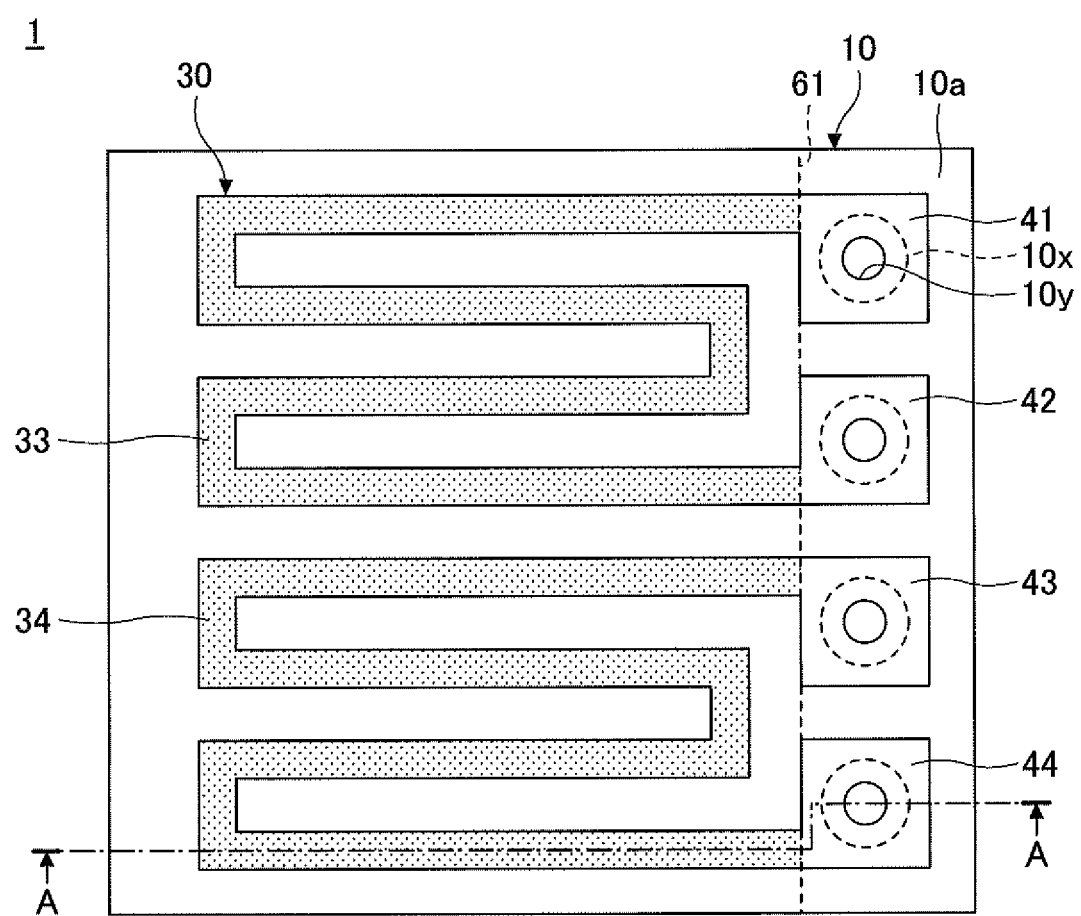
FIG. 1 is a plan view of an example of a strain gauge according to a first embodiment.
Figure 2:
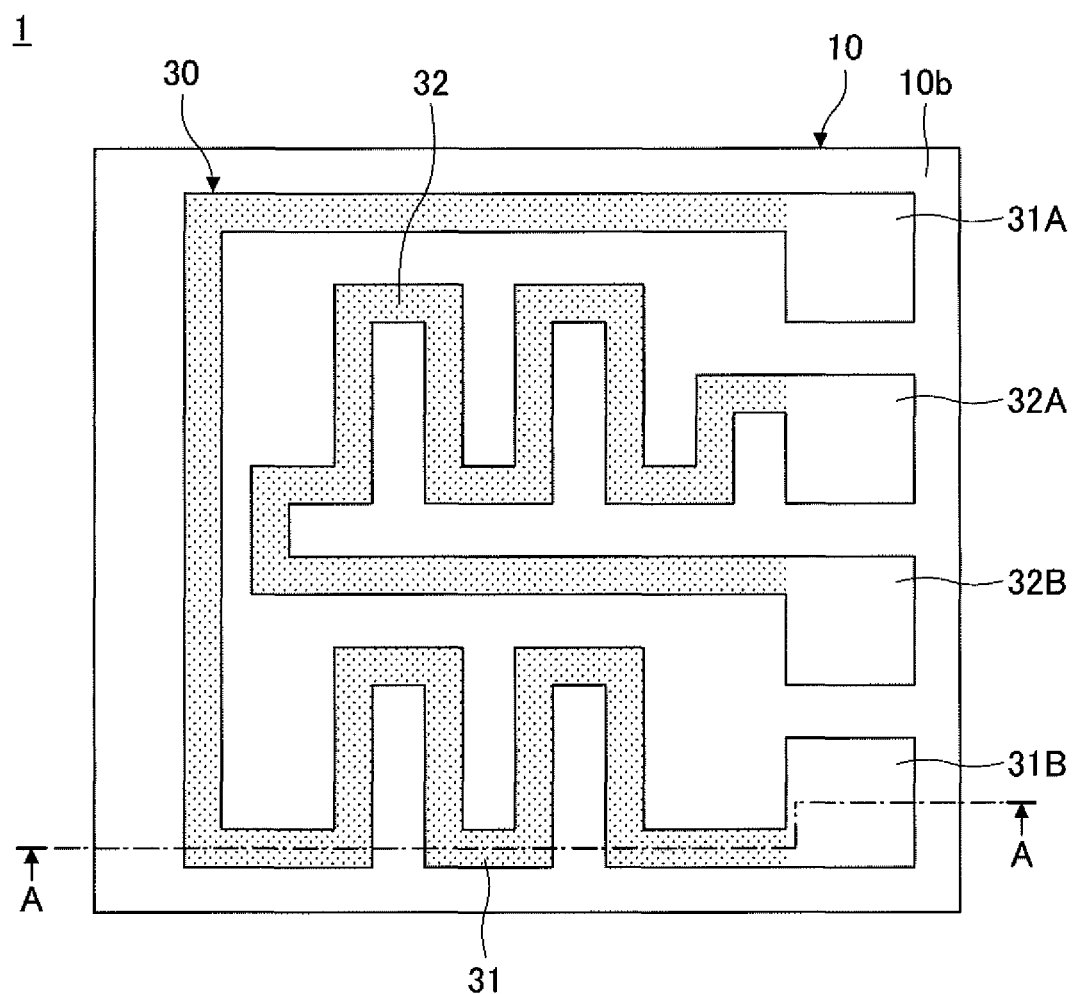
FIG. 2 is a plan view of an example of a pattern of resistors 31 and 32 in the strain gauge according to the first embodiment.
Figure 3:
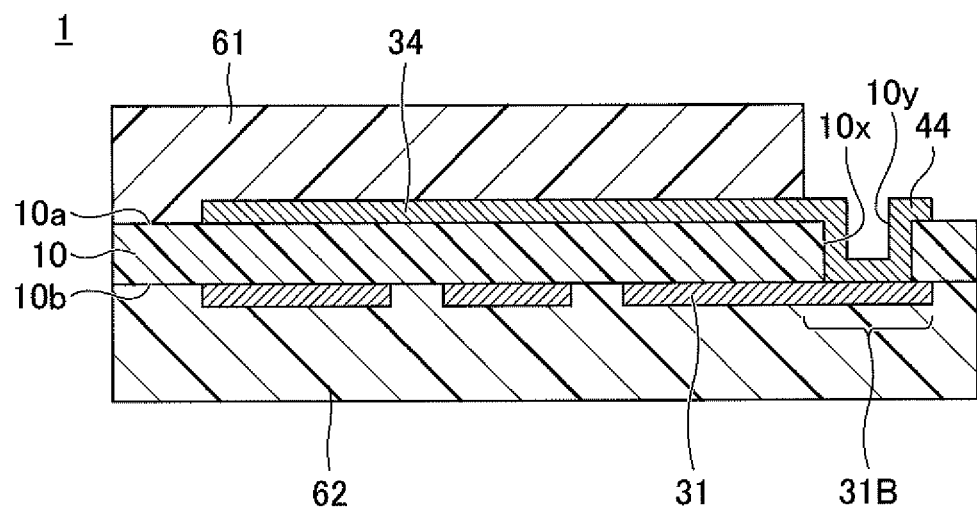
FIG. 3 is a cross-sectional view (part 1) of an example of the strain gauge according to the first embodiment.

FIG. 1 is a plan view of an example of a strain gauge according to a first embodiment. FIG. 2 is a plan view of an example of a pattern of resistors 31 and 32 in the strain gauge according to the first embodiment. FIG. 3 is a cross-sectional view of an example of the strain gauge according to the first embodiment, and illustrates a cross section taken along the A-A line in FIGS. 1 and 2. With reference to FIGS. 1 to 3, the strain gauge 1 includes a substrate 10; resistors 30 (resistors 31 to 34); terminal sections 41 to 44; and cover layers 61 and 62.

Note that in the present embodiment, for the sake of convenience, with respect to the strain gauge 1, the side of the substrate 10 where the resistors 33 and 34 are provided is referred to as an upper side or one side; and the side of the substrate 10 where the resistors 31 and 32 are provided is referred to as a lower side or another side. Further, for each component, the surface on the side where the resistors 33 and 34 are provided is referred to as one surface or an upper surface; and the surface on the side where the resistors 31 and 32 are provided is referred to as another surface or a lower surface. However, the strain gauge 1 can be used in a state of being upside down, or be disposed at any angle. Further, a plan view means that an object is viewed from a normal direction of an upper surface 10a of the substrate 10, and a planar shape refers to a shape of an object when viewed from the normal direction of the upper surface 10a of the substrate 10.

The substrate 10 is a member that is a base layer for forming the resistors 30 or the like and is flexible. The thickness of the substrate 10 is not particularly restricted, and can be appropriately selected for any purpose. For example, such a thickness can be approximately between 5 μm and 500 μm. In particular, when the thickness of the substrate 10 is between 5 μm and 200 μm, it is preferable in that a difference in strain sensitivity with respect to the resistors 31 to 34 can be reduced.

The substrate 10 can be formed of an insulating resin film such as a PI (polyimide) resin, an epoxy resin, a PEEK (polyether ether ketone) resin, a PEN (polyethylene naphthalate) resin, a PET (polyethylene terephthalate) resin, a PPS (polyphenylene sulfide) resin, or a polyolefin resin. Note that the film refers to a flexible member having a thickness of about 500 μm or less.

Here, the "formed of an insulating resin film" is not intended to preclude the substrate 10 from containing fillers, impurities, or the like in the insulating resin film. The substrate 10 may be formed of, for example, an insulating resin film containing fillers such as silica or alumina.

Each resistor 30 is formed on the substrate 10 and is a sensitive section where resistance varies according to strain. The resistors 30 include the resistors 31 and 32 and the resistors 33 and 34, which are laminated via the substrate 10. In other words, the resistors 31 to 34 are collectively referred to as the resistors 30. When it is not particularly necessary to distinguish among the resistors 31 to 34, they are collectively referred to as the resistors 30. Note that in FIGS. 1 and 2, for the sake of convenience, the resistors 31 to 34 are each illustrated in a crepe pattern.

The resistors 31 and 32 are thin films each of which is formed in a predetermined pattern and on the side of the lower surface 10b of the substrate 10. Each of the resistors 31 and 32 may be formed directly on the lower surface 10b of the substrate 10, or be formed below the lower surface 10b of the substrate 10, via other layer(s). The resistor 31 and the resistor 32 can be disposed such that, for example, grid directions thereof are identical.

A pad 31A for receiving a via is formed at one end portion of the resistor 31, and a pad 31B for receiving a via is formed at another end portion of the resistor 31. The respective pads 31A and 31B extend from both end portions of the resistor 31 and are each wider than the resistor 31 to be formed in an appropriately rectangular shape, in a plan view.

A pad 32A for receiving a via is formed at one end portion of the resistor 32, and a pad 32B for receiving a via is formed at another end portion of the resistor 32. The respective pads 32A and 32B extend from both end portions of the resistor 32 and are each wider than the resistor 32 to be formed in an appropriately rectangular shape, in a plan view.

The resistors 33 and 34 are thin films each of which is formed in a predetermined pattern and on the side of the upper surface 10a of the substrate 10. Each of the resistors 33 and 34 may be formed directly on the upper surface 10a of the substrate 10, or be formed above the upper surface 10a of the substrate 10, via other layer(s). The resistor 33 and the resistor 34 can be disposed such that, for example, grid directions thereof are identical. Further, the resistors 33 and 34 can be disposed such that, for example, grid directions thereof are perpendicular to those of the resistors 31 and 32.

The resistors 30 (resistors 31 to 34) can be each formed of, for example, material including Cr (chromium); material including Ni (nickel); or material including both of Cr and Ni. In other words, the resistors 30 can be each formed of material including at least one from among Cr and Ni. An example of the material including Cr includes a Cr composite film. An example of the material including Ni includes Cu—Ni (copper nickel). An example of the material including both of Cr and Ni includes NiCr (nickel chromium).

Here, the Cr composite film is a composite film of Cr, CrN, $Cr_2N$, and the like. The Cr composite film may include incidental impurities such as chromium oxide.

The thickness of each resistor 30 is not particularly restricted, and can be appropriately selected for any purpose. The thickness can be, for example, approximately between 0.05 µm and 2 µm. In particular, when the thickness of each resistor 30 is 0.1 µm or more, it is preferable in terms of improvement in crystallinity (e.g., crystallinity of α-Cr) of a crystal that constitutes the resistor 30, and when the thickness of each resistor 30 is 1 µm or less, it is further preferable in terms of reduction in cracks of a given film caused by internal stress of the film that constitutes the resistor 30, or reduction in warp in the substrate 10.

For example, when each resistor 30 is the Cr composite film, the resistor is formed with α-Cr (alpha-chromium) as the main component having a stable crystalline phase, so that stability of the gauge characteristics can be improved. Additionally, when each resistor 30 is formed with α-Cr as the main component, a gauge factor of the strain gauge 1 can be 10 or more, as well as a gauge factor temperature coefficient TCS and temperature coefficient of resistance TCR being able to be each in the range of from −1000 ppm/° C. to +1000 ppm/° C. Here, a main component means that a target substance has 50% by weight or more of total substances that constitute the resistor. Each resistor 30 preferably includes α-Cr of 80% by weight or more, from the viewpoint of improving the gauge characteristics. Note that α-Cr is Cr having a bcc structure (body-centered cubic structure).

The terminal sections 41, 42, 43, and 44 are formed on the substrate 10. Each of the terminal sections 41 to 44 may be formed directly on the upper surface 10a of the substrate 10, or be formed above the upper surface 10a of the substrate 10, via other layer(s). Each of the terminal sections 41 to 44 is an electrode for input or output, where, for example, a lead wire for an external connection, or the like is joined.

The terminal sections 41 and 42 respectively extend from both end portions of the resistor 33 and are each wider than the resistor 33 to be formed in an approximately rectangular shape, in a plan view. For example, the resistor 33 extends from the terminal section 41, with zigzagged hairpin turns, to be connected to the terminal section 42. The upper surface of each of the terminal sections 41 and 42 may be coated with a metal allowing for increased solderability than the terminal sections 41 and 42.

The terminal sections 43 and 44 respectively extend from both end portions of the resistor 34 and are each wider than the resistor 34 to be formed in an approximately rectangular shape, in a plan view. For example, the resistor 34 extends from the terminal section 43 to the terminal section 44, with zigzagged hairpin turns. The upper surface of each of the terminal sections 43 and 44 may be coated with a metal allowing for increased solderability than the terminal sections 43 and 44.

The terminal section 41 is electrically connected to the pad 31A that is exposed in a given via hole 10x, through the via hole 10x provided through the substrate 10. The terminal section 41 is continuously formed, for example, from the upper surface 10a of the substrate 10, on a sidewall of the via hole 10x and on an upper surface of the pad 31A exposed in the via hole 10x, so that the terminal section 41 is electrically connected to the pad 31A.

In a portion of the terminal section 41 that is formed on the sidewall of the via hole 10x and on the upper surface of the one pad 31A exposed in the via hole 10x, a recessed portion 10y is formed in the via hole 10x. However, with respect to the terminal 41, the via hole 10x may be filled up (the recessed portion 10y may not be formed).

The terminal section 42 is electrically connected to the pad 32A exposed in a given via hole 10x, through the via hole 10x provided through the substrate 10. The terminal section 42 is continuously formed, for example, from the upper surface 10a of the substrate 10, on a sidewall of the via hole 10x and on an upper surface of the pad 32A exposed in the via hole 10x, so that the terminal section 42 is electrically connected to the pad 32A.

In a portion of the terminal section 42 that is formed on the sidewall of the via hole 10x and on the upper surface of the one pad 32A exposed in the via hole 10x, a recessed portion 10y is formed in the via hole 10x. However, with respect to the terminal section 42, the via hole 10x may be filled up (the recessed portion 10y may not be formed).

The terminal section 43 is electrically connected to the pad 32B exposed in a given via hole 10x, through the via hole 10x provided through the substrate 10. The terminal section 43 is continuously formed, for example, from the upper surface 10a of the substrate 10, on a sidewall of the via hole 10x and on an upper surface of the pad 32B exposed in the via hole 10x, so that the terminal section 43 is electrically connected to the pad 32B.

In a portion of the terminal section 43 that is formed on the sidewall of the via hole 10x and on the upper surface of the one pad 32B exposed in the via hole 10x, a recessed portion 10y is formed in the via hole 10x. However, with respect to the terminal section 43, the via hole 10x may be filled up (the recessed portion 10y may not be formed).

The terminal section 44 is electrically connected to the pad 31B exposed in a given via hole 10x, through the via hole 10x provided through the substrate 10. The terminal section 44 is continuously formed, for example, from the upper surface 10a of the substrate 10, on a sidewall of the via hole 10x and on an upper surface of the pad 31B exposed in the via hole 10x, so that the terminal section 44 is electrically connected to the pad 31B.

In a portion of the terminal section 44 that is formed on the sidewall of the via hole 10x and on the upper surface of the one pad 31B exposed in the via hole 10x, a recessed portion 10y is formed in the via hole 10x. However, with respect to the terminal section 44, the via hole 10x may be filled up (the recessed portion 10y may not be formed).

Note that for the sake of convenience, the resistors 33 and 34 and the terminal sections 41 to 44 are expressed by different numerals. However, those can be integrally formed of the same material, in the same process.

Figure 4:
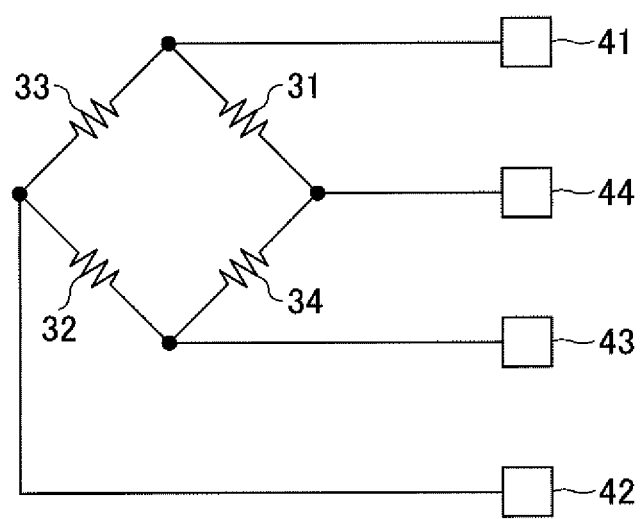
FIG. 4 is a circuit diagram for explaining connection of four resistors.

FIG. 4 is a circuit diagram for explaining connection of the four resistors. As illustrated in FIG. 4, the resistors 31 to 34 are electrically connected to each other to form a Wheatstone bridge circuit. In the Wheatstone bridge circuit illustrated in FIG. 4, for example, an input voltage is applied across the terminal section 41 and the terminal section 43, so that an output voltage can be obtained from the terminal section 42 and the terminal section 44. By increasing the output voltage, strain can be detected.

Referring back to the explanation in FIGS. 1 to 3, a cover layer 61 is an insulating resin layer provided on and above the upper surface 10a of the substrate 10, such that the resistors 33 and 34 are coated and the terminal sections 41 to 44 are exposed. With the cover layer 61 being provided, mechanical damage, and the like can be prevented from occurring in the resistors 33 and 34. Additionally, with the cover layer 61 being provided, the resistors 33 and 34 can be protected against moisture, and the like. Note that the cover layer 61 may be provided to cover all portions except for the terminal sections 41 to 44.

A cover layer 62 is an insulating resin layer provided on and below the lower surface 10b of the substrate 10, such that the resistors 31 and 32; the pads 31A and 31B; and the pads 32A and 32B are coated. With the cover layer 62 being provided, mechanical damage, and the like can be prevented from occurring in the resistors 31 and 32; the pads 31A and 31B; and the pads 32A and 32B. Additionally, with the cover layer 62 being provided, the resistors 31 and 32; the pads 31A and 31B; and the pads 32A and 32B can be protected against moisture, and the like.

Each of the cover layers 61 and 62 can be formed of an insulating resin such as a PI resin, an epoxy resin, a PEEK resin, a PEN resin, a PET resin, a PPS resin, or a composite resin (e.g., a silicone resin or a polyolefin resin). Each of the cover layers 61 and 62 may contain fillers or pigments. The thickness of each of the cover layers 61 and 62 is not particularly restricted, and can be appropriately selected for any purpose. For example, such a thickness can be approximately between 5 μm and 500 μm. In particular, when the thickness of the cover layer 62 is between 5 μm and 200 μm, it is preferable in terms of strain transfer from a flexure element surface that is bonded to a lower surface of the cover layer 62 via an adhesive layer or the like; and dimensional stability with respect to environment, and when the thickness is 10 μm or more, it is further preferable in terms of insulation. Note that the cover layer 61 and the cover layer 62 may be formed of different materials, or be formed to have different thicknesses.

FIGS. 5A to 5D are diagrams illustrating a process of manufacturing the strain gauge according to the first embodiment, and each illustrate a cross section corresponding to FIG. 3.

Figure 5A:
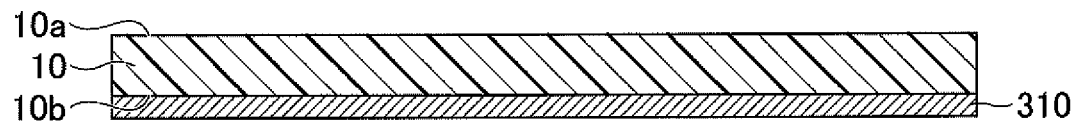
FIG. 5A is a diagram (part 1) illustrating an example of a process of manufacturing the strain gauge according to the first embodiment.

In order to manufacture the strain gauge 1, first, in the process illustrated in FIG. 5A, the substrate 10 is prepared and a metallic layer 310, which is finally patterned to become the resistors 31 and 32; the pads 31A and 31B; and the pads 32A and 32B, is formed on the entire lower surface 10b of the substrate 10. The material and thickness of the metallic layer 310 are the same as the material and thickness of the resistors 30 (resistors 31 and 32) described above.

The metallic layer 310 can be deposited by magnetron sputtering in which, for example, a raw material capable of forming the metallic layer 310 is a target. Instead of magnetron sputtering, the metallic layer 310 may be deposited by reactive sputtering, vapor deposition, arc ion plating, pulsed laser deposition, or the like.

From the viewpoint of stabilizing the gauge characteristics, before depositing the metallic layer 310, preferably, as a base layer, a functional layer having a film thickness that is approximately between 1 nm and 100 nm is vacuum-deposited on the lower surface 10b of the substrate 10, by conventional sputtering, for example.

In the present application, the functional layer refers to a layer that has a function of promoting crystal growth of the resistors (where the metallic layer 310 is patterned) each of which is at least an upper layer. The functional layer preferably further has a function of preventing oxidation of the resistors each of which is an upper layer, caused by oxygen and moisture included in the substrate 10 and the like, as well as a function of improving adhesion between the substrate 10, etc. and a given resistor from among the resistors each of which is an upper layer. The functional layer may further have other functions.

An insulating resin film that constitutes the substrate 10 contains oxygen and moisture. In this regard, particularly when the resistors each of which is an upper layer include Cr, it is effective for the functional layer to have a function of preventing oxidation of the resistors each of which is an upper layer, because Cr forms an autoxidized film.

The material of the functional layer is not particularly restricted as long as it is material having a function of promoting crystal growth of the resistors each of which is at least an upper layer. Such material can be appropriately selected for any purpose, and includes one or more metals selected from the group consisting of, for example, Cr (chromium), Ti (titanium), V (vanadium), Nb (niobium Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum); an alloy of any metals from among the group; or a compound of any metal from among the group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

The functional layer can be vacuum-deposited by, for example, conventional sputtering in which a raw material capable of forming the functional layer is the target and in which an Ar (argon) gas is supplied to a chamber. By using conventional sputtering, the functional layer is deposited while the lower surface 10b of the substrate 10 is etched with Ar. Thus, a deposited amount of the film of the functional layer is minimized and thus an effect of improving adhesion can be obtained.

However, this is an example of a method of depositing the functional layer, and the functional layer may be deposited by other methods. For example, before depositing the functional layer, the lower surface 10b of the substrate 10 is activated by plasma treatment using Ar, etc. or the like to thereby obtain the effect of improving the adhesion; subsequently, the functional layer may be vacuum-deposited by magnetron sputtering.

A combination of the material of the functional layer and the material of the resistors each of which is an upper layer is not particularly restricted, and can be appropriately selected for any purpose. For example, Ti is used for the functional layer, and a Cr composite film formed with α-Cr (alpha-chromium) as the main component can be deposited as each of the resistors that is an upper layer.

In this case, each of the resistors that is an upper layer can be deposited by, for example, magnetron sputtering in which a raw material capable of forming the Cr composite film is the target and in which an Ar gas is supplied to a chamber. Alternatively, each of the resistors that is an upper layer may be deposited by reactive sputtering in which pure Cr is the target and in which an appropriate amount of nitrogen gas, as well as an Ar gas, are supplied to a chamber.

In such methods, a growth face of the Cr composite film is defined by the functional layer formed of Ti, and the Cr composite film that is formed with α-Cr as the main component having a stable crystalline structure can be deposited. Also, Ti that constitutes the functional layer is diffused into the Cr composite film, so that the gauge characteristics are improved. For example, the gauge factor of the strain gauge 1 can be 10 or more, as well as the gauge factor temperature coefficient TCS and temperature coefficient of resistance TCR being each able to be in the range of from −1000 ppm/° C. to +1000 ppm/° C. Note that, when the functional layer is formed of Ti, the Cr composite film may include Ti or TiN (titanium nitride).

Note that when the resistors each of which is an upper layer are Cr composite films, the functional layer formed of Ti includes all functions being a function of promoting crystal growth of the resistors each of which is an upper layer; a function of preventing oxidation of the resistors each of which is an upper layer, caused by oxygen or moisture contained in the substrate 10; and a function of improving adhesion between the substrate 10 and a given resistor from among the resistors each of which is an upper layer. Instead of Ti, when the functional layer is formed of Ta, Si, Al, or Fe, the functional layer also includes the same functions.

As described above, with the functional layer being provided in the lower layer of the resistors, the crystal growth of the resistors each of which is an upper layer can be promoted and thus the resistors each having a stable crystalline phase can be fabricated. As a result, with respect to the strain gauge 1, stability of the gauge characteristics can be improved. Also, the material that constitutes the functional layer is diffused into the resistors each of which is an upper layer, so that the gauge characteristics of the strain gauge 1 can be thereby improved.

Figure 5B:
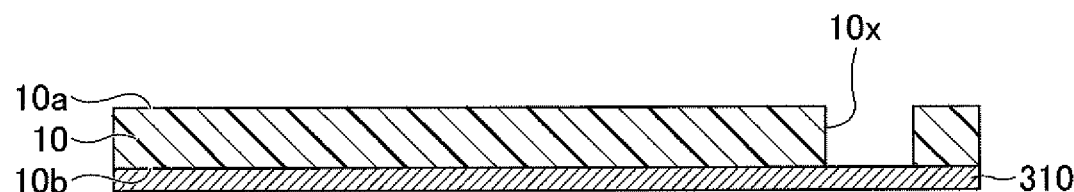
FIG. 5B is a diagram (part 2) illustrating an example of the process of manufacturing the strain gauge according to the first embodiment.

Then, in the process in FIG. 5B, the via holes 10x that are provided through the substrate 10 and that expose the upper surface of the metallic layer 310 are formed. The via holes 10x can be formed by laser processing, for example. The via holes 10x are formed in respective regions where the pads 31A and 31B and the pads 32A and 32B are formed by the metallic layer 310 being patterned.

Figure 5C:
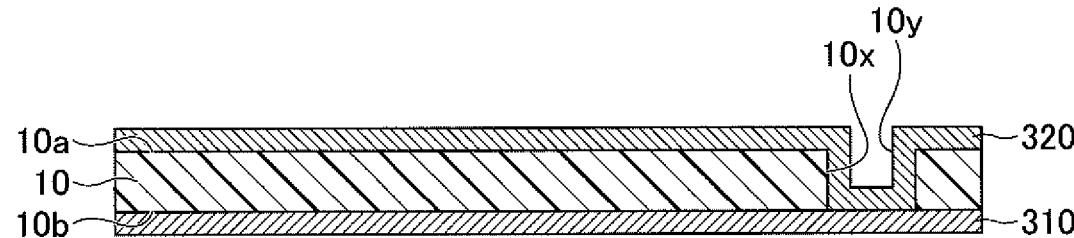
FIG. 5C is a diagram (part 3) illustrating an example of the process of manufacturing the strain gauge according to the first embodiment.

Then, in the process in FIG. 5C, a metallic layer 320, which is finally patterned to become the resistors 33 and 34 and the terminals 41 to 44, is formed on the entire upper surface 10a of the substrate 10. The metallic layer 320 is continuously formed, from the upper surface 10a of the substrate 10, on the sidewalls of the via holes 10x and on the upper surface of the metallic layer 310 that is exposed in the via holes 10x, so that the metallic layer 320 is electrically connected to the metallic layer 310.

In respective portions of the metallic layer 320 that is formed on the sidewalls of the via holes 10x and on the upper surface of the metallic layer 310 exposed in the via holes 10x, the recessed portions 10y are formed in the respective via holes 10x. However, with respect to the metallic layer 310, each via hole 10x may be filled up (recessed portions 10y may not be formed).

The material and thickness of the metallic layer 320 can be the same as the material and thickness of the metallic layer 310. For example, the metallic layer 320 can be formed by the same method as described in the metallic layer 310. For the same reason as described in the metallic layer 310, before depositing the metallic layer 320, preferably, as a base layer, a functional layer having a film thickness that is approximately between 1 nm and 100 nm is vacuum-deposited on the upper surface 10a of the substrate 10, by conventional sputtering, for example.

Figure 5D:
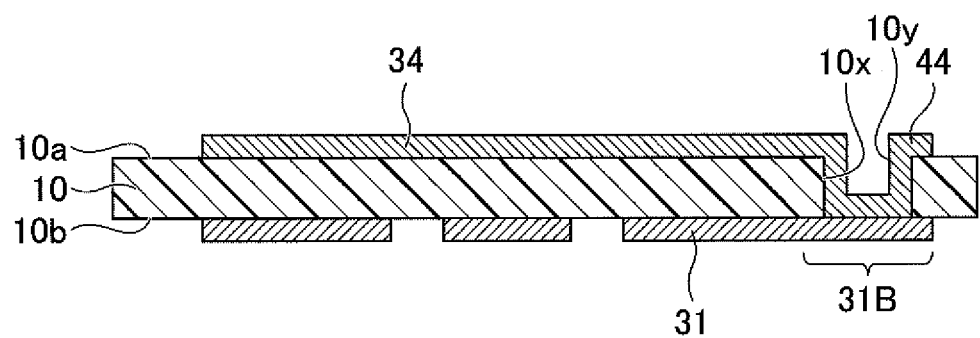
FIG. 5D is a diagram (part 4) illustrating an example of the process of manufacturing the strain gauge according to the first embodiment.

Then, in the process in FIG. 5D, the functional layer formed on the lower surface 10b of the substrate 10; and the metallic layer 310, as well as the functional layer formed on the upper surface 10a of the substrate 10; and the metallic layer 320, are patterned by photolithography. Thereby, the resistors 31 and 32; the pads 31A and 31B; and the pads 32A and 32B, each of which has the shape in FIG. 2, are formed below the lower surface 10b of the substrate 10, and, the resistors 33 and 34; and the terminal sections 41 to 44, each of which has the shape in FIG. 1, are formed above the upper surface 10a of the substrate 10. By concurrently patterning the metallic layer 310 and the metallic layer 320 with photolithography, relative positional accuracy of the resistors 31 and 32; and the resistors 33 and 34 can be improved.

After the process in FIG. 5D, the cover layer 61 with which the resistors 33 and 34 are coated and that exposes the terminal sections 41 to 44 is formed on and above the upper surface 10a of the substrate 10. Further, the cover layer 62 with which the resistors 31 and 32; the pads 31A and 31B; and the pads 32A and 32B are coated is formed on and below the lower surface 10b of the substrate 10. The material and thickness for each of the cover layers 61 and 62 are described above.

For example, the cover layer 61 can be fabricated, such that a thermosetting insulating resin film in a semi-cured state is laminated on the upper surface 10a of the substrate 10, and such that the resistors 33 and 34 are coated therewith and the terminal sections 41 to 44 are exposed; subsequently, heat is added and curing is performed. The cover layer 61 may be fabricated, such that a thermosetting insulating resin that is liquid or paste-like is applied to the upper surface 10a of the substrate 10, and such that the resistors 33 and 34 are coated therewith and the terminal sections 41 to 44 are exposed; subsequently, heat is added and curing is performed. The cover layer 62 can be fabricated by the same method as described in the cover layer 61. In the above process, the strain gauge 1 is completed.

Figure 6:
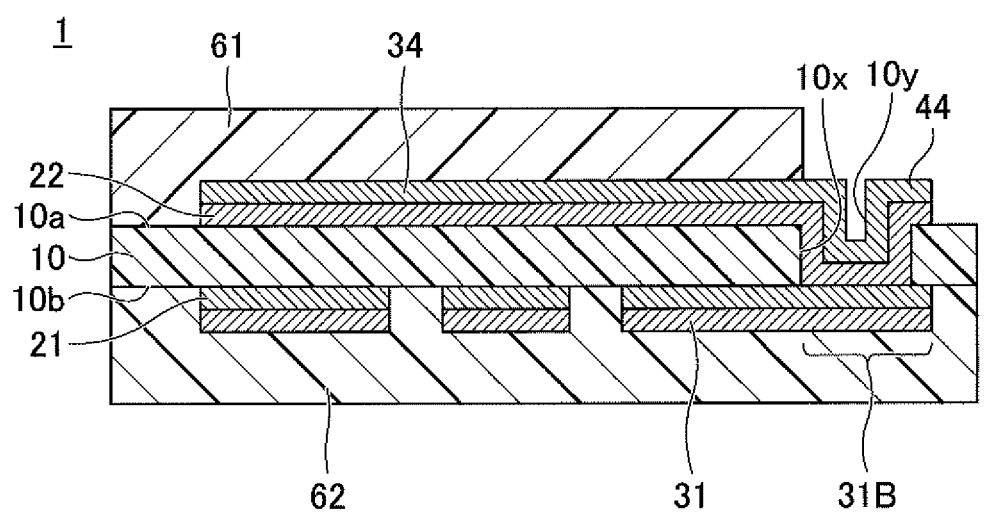
FIG. 6 is a cross-sectional view (part 2) of an example of the strain gauge according to the first embodiment.

Note that when the functional layer, as a base layer of the metallic layer 310 that becomes the resistors 31 and 32, the pads 31A and 31B, and the pads 32A and 32B, is provided on the lower surface 10b of the substrate 10; and the functional layer, as a base layer of the metallic layer 320 that becomes the resistors 33 and 34 and the terminal sections 41 to 44, is provided on the upper surface 10a of the substrate 10, the strain gauge 1 has a cross-section shape illustrated in FIG. 6. Layers expressed by the numerals 21 and 22 are the functional layers. The planar shapes of the strain gauge 1 in the case of providing the functional layers 21 and 22 are the same as those in FIGS. 1 and 2.

As described above, for the strain gauge 1, the resistors 31 and 32 are formed on or below the lower surface 10b of the substrate 10, the resistors 33 and 34 are formed on or above the upper surface 10a of the substrate 10, and the resistors 31, 32, 33, and 34 are connected to each other to constitute the Wheatstone bridge circuit. Thereby, the planar shape of the strain gauge can be reduced in comparison to the conventional structure in which four resistors are formed in the same plane of a substrate to constitute the Wheatstone bridge circuit.

The resistors 31 and 32 as well as the resistors 33 and 34 can be formed by concurrently patterning the metallic layers formed on both surfaces of the substrate 10, with photolithography. As a result, it is possible to improve the relative positional accuracy of the resistors 31 and 32 and the resistors 33 and 34.

The strain gauge 1 has a laminated structure in which the top and bottom of the substrate 10 are approximately symmetric. In other words, the resistors 31 and 32 and the cover layer 62 are laminated on the side of the lower surface 10b of the substrate 10, and the resistors 33 and 34 and the cover layer 61 are laminated on the side of the upper surface 10a of the substrate 10. In the structure, warp occurring in the strain gauge 1 can be reduced.

Further, with respect to the strain gauge 1, as the resistors 30, a multilayer structure in which a plurality of resistors are laminated is taken, so that the planar shape of the strain gauge is thereby reduced. Thus, strain in a relatively narrow area of the measured object can be measured.

The strain gauge 1 is small and thus the number of gauges that are obtained from the same sheet can increase. Accordingly, productivity can be improved.

The preferred embodiment and the like have been described above, but are not limited to the above embodiment and the like. Various modifications and alternatives to the above embodiment and the like can be made without departing from a scope set forth in the claims.

This International application claims priority to Japanese Patent Application No. 2017-220408, filed Nov. 15, 2017, the contents of which are incorporated herein by reference in their entirety.

REFERENCE SIGNS LIST 1 strain gauge, 10 substrate, 10a upper surface, 10b lower surface, 10x via hole, 10y recessed portion, 21, 22 functional layer, 30 resistor, 31, 32, 33, 34 resistor, 41, 42, 43, 44 terminal section, 61, 62 cover layer

The invention claimed is:

1. A strain gauge comprising:
a flexible resin substrate;
resistors each formed of a film that includes Cr, CrN, and $Cr_2N$; and
a functional layer formed of a metal, an alloy, or a metal compound, the functional layer being in a lower surface of the resistors,
wherein an element included in the functional layer is diffused into the film,
wherein the resistors include a first resistor and a second resistor that are formed on one side of the substrate; and a third resistor and a fourth resistor that are formed on another side of the substrate,
wherein the first resistor, the second resistor, the third resistor, and the fourth resistor constitute a Wheatstone bridge circuit, and
wherein a gauge factor of the strain gauge is 10 or more.

2. The strain gauge according to claim 1, further comprising two electrodes for applying an input voltage to the Wheatstone bridge circuit; and two other electrodes for obtaining an output voltage of the Wheatstone bridge circuit,
wherein the two electrodes and the two other electrodes are formed on the one side of the substrate.

3. The strain gauge according to claim 2, wherein the two electrodes and the two other electrodes are electrically each connected, through a given via hole provided in the substrate, to a corresponding pad from among pads extending from both end portions of each of the third resistor and the fourth resistor, and
wherein each of the two electrodes and the two other electrodes is continuously formed, from the one side of the substrate, on a sidewall of the via hole and on a surface of the pad exposed in the via hole, so that a recessed portion is formed in the via hole.

4. The strain gauge according to claim 1, further comprising a first insulating resin layer with which the first resistor and the second resistor are coated and that is formed on the one side of the substrate; and
a second insulating resin layer with which the third resistor and the fourth resistor are coated and that is formed on the another side of the substrate.

5. The strain gauge according to claim 1, wherein a main component of each resistor is alpha-chromium.

6. The strain gauge according to claim 5, wherein each resistor includes alpha-chromium at 80% by weight or more.

7. The strain gauge according to claim 1, wherein the functional layer includes a function of promoting crystal growth of the resistor.

8. A strain gauge comprising:
a flexible resin substrate:
resistors each formed of a film that includes Cr, CrN, and $Cr_2N$; and
a functional layer formed of a metal, an alloy, or a metal compound, the functional layer being in a lower surface of the resistors,
wherein an element included in the functional layer is diffused into the film,
wherein the resistors include a first resistor and a second resistor that are formed on one side of the substrate; and a third resistor and a fourth resistor that are formed on another side of the substrate,
wherein the first resistor, the second resistor, the third resistor, and the fourth resistor constitute a Wheatstone bridge circuit, and wherein a temperature coefficient of resistance of the strain gauge is in a range of from −1000 ppm/° C. to +1000 ppm/° C.

9. A strain gauge comprising:
a flexible resin substrate;
resistors each formed of a film that includes Cr, CrN, and $Cr_2N$; and
a functional layer formed of a metal, an alloy, or a metal compound, the functional layer being in a lower surface of the resistors,
wherein the resistors include a first resistor and a second resistor that are formed on one side of the substrate; and a third resistor and a fourth resistor that are formed on another side of the substrate, and
wherein the first resistor, the second resistor, the third resistor, and the fourth resistor constitute a Wheatstone bridge circuit.

\* \* \* \* \*